United States Patent
Liu et al.

(10) Patent No.: US 11,934,206 B2
(45) Date of Patent: Mar. 19, 2024

(54) GIMBAL CONTROL METHOD AND DEVICE

(71) Applicant: SZ DJI TECHNOLOGY CO., LTD., Shenzhen (CN)

(72) Inventors: Shuai Liu, Shenzhen (CN); Ziyi Pan, Shenzhen (CN); Liyuan Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 869 days.

(21) Appl. No.: 16/943,228

(22) Filed: Jul. 30, 2020

(65) Prior Publication Data

US 2020/0356112 A1 Nov. 12, 2020

Related U.S. Application Data

(63) Continuation of application No. PCT/CN2018/074682, filed on Jan. 31, 2018.

(51) Int. Cl.
*G05D 1/08* (2006.01)
*B64C 39/02* (2023.01)
(Continued)

(52) U.S. Cl.
CPC .......... *G05D 1/085* (2013.01); *B64C 39/024* (2013.01); *G05D 1/0016* (2013.01);
(Continued)

(58) Field of Classification Search
CPC .... G05D 1/085; G05D 1/0016; G05D 1/0808; G05D 1/101; B64C 39/024;
(Continued)

(56) References Cited

U.S. PATENT DOCUMENTS

| | | | |
|---|---|---|---|
| 2013/0314694 A1* | 11/2013 | Tchoryk, Jr. | ............ G01S 17/58 356/28.5 |
| 2013/0321656 A1 | 12/2013 | Ducharme et al. | |

(Continued)

FOREIGN PATENT DOCUMENTS

| | | |
|---|---|---|
| CN | 102360224 A | 2/2012 |
| CN | 102591346 A | 7/2012 |

(Continued)

OTHER PUBLICATIONS

Ma et al., "Four-axis gimbal system application based on gimbal self-adaptation adjustment" Proceedings of the 34th Chinese Control Conference Jul. 28-30, 2015, Hangzhou, China—pp. 8866 to 8871 (Year: 2015).*

(Continued)

*Primary Examiner* — Quoc A Tran
(74) *Attorney, Agent, or Firm* — ANOVA LAW GROUP, PLLC

(57) ABSTRACT

Embodiments of the present disclosure provide a gimbal control method. The method includes receiving a first position and a second position wherein the first position and the second position are touched positions of an operation interface of a terminal; determining a rotation angle of the gimbal based on the first position, the second position, and an attitude of the gimbal at the first position; and controlling rotation of the gimbal based on the rotation angle.

16 Claims, 3 Drawing Sheets

- S201 — Receive a first position and a second position where an operation interface of a terminal are touched
- S202 — Determine a rotation angle of the gimbal based on the first position, the second position, and an attitude of the gimbal at the first position
- S203 — Control the rotation of the gimbal based on the rotation angle

(51) Int. Cl.
*B64D 47/08* (2006.01)
*B64U 101/30* (2023.01)
*G05D 1/00* (2006.01)
*G05D 1/10* (2006.01)
*G06F 3/0488* (2022.01)
*H04N 7/18* (2006.01)

(52) U.S. Cl.
CPC ............ *G06F 3/0488* (2013.01); *B64D 47/08* (2013.01); *B64U 2101/30* (2023.01); *B64U 2201/20* (2023.01); *G05D 1/0808* (2013.01); *G05D 1/101* (2013.01); *H04N 7/18* (2013.01)

(58) Field of Classification Search
CPC .............. G06F 3/0488; B64U 2201/20; B64U 2101/30; B64D 47/08; H04N 7/18

See application file for complete search history.

(56) References Cited

U.S. PATENT DOCUMENTS

| | | | |
|---|---|---|---|
| 2017/0227162 A1* | 8/2017 | Saika | ................. F16M 11/121 |
| 2017/0280054 A1 | 9/2017 | Li | |

FOREIGN PATENT DOCUMENTS

| | | |
|---|---|---|
| CN | 103108170 A | 5/2013 |
| CN | 104486543 A | 4/2015 |
| CN | 105867362 A | 8/2016 |
| CN | 106249761 A1 | 12/2016 |
| CN | 107000839 A | 8/2017 |
| CN | 107077146 A1 | 8/2017 |
| CN | 206417213 U | 8/2017 |
| JP | 2012507011 A * | 3/2012 |

OTHER PUBLICATIONS

The World Intellectual Property Organization (WIPO) International Search Report for PCT/CN2018/074682 dated Oct. 23, 2018 5 pages.

* cited by examiner

GIMBAL CONTROL METHOD AND DEVICE

CROSS-REFERENCE TO RELATED APPLICATION

This application is a continuation of International Application No. PCT/CN2018/074682, filed on Jan. 31, 2018, the entire content of which is incorporated herein by reference.

TECHNICAL FIELD

The present disclosure relates to the field of gimbal control and, more specifically, to a gimbal control method and device.

BACKGROUND

Aerial photography drones, filming, and physical games have developed rapidly in recent years, and gimbal have played an important role in these fields. Gimbals are generally used for stabilization purpose. However, while achieving stabilization through the gimbal, it is necessary to consider the fun in controlling the gimbal rotation and ways to better conform to the user's customary operation methods. In conventional technology, gimbal rotation is realized by controlling the angular velocity of the gimbal. If the gimbal needs to be stopped, it is necessary to enter a stop instruction or a movement time to the gimbal again. This method is complicated and cannot meet gaming needs.

SUMMARY

One aspect of the present disclosure provides a gimbal control method. The method includes receiving a first position and a second position wherein the first position and the second position are touched positions of an operation interface of a terminal; determining a rotation angle of the gimbal based on the first position, the second position, and an attitude of the gimbal at the first position; and controlling rotation of the gimbal based on the rotation angle.

Another aspect of the present disclosure provides a gimbal control device. The device includes a first processor; an axis assembly, the first processor being communicatively connected to the axis assembly and a terminal; the first processor including one or more first processors operating individually or collectively. The first processor is configured to: receive a first position and a second position wherein the first position and the second position are touched positions of an operation interface of a terminal; determine a rotation angle of the gimbal based on the first position, the second position, and an attitude of the gimbal at the first position; and control rotation of the gimbal based on the rotation angle.

Another aspect of the present disclosure provides a gimbal control method. The method includes receiving a real-time position where an operation interface is being touched; and sending the real-time position to a gimbal based on a pre-set transmission frequency to control the rotation of the gimbal.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

REFERENCE NUMERALS

Figure 1:
FIG. 1 is a structural block diagram of a gimbal control system according to an embodiment of the present disclosure.

100 Gimbal
110 First processor
120 Axis assembly
130 First storage device
200 Terminal
210 Second processor
220 Second storage device
300 Cart chassis
400 Camera

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

The gimbal control method and device of the present disclosure will be described in detail below with reference to the drawing. In the situation where the technical solutions described in the embodiments are not conflicting, they can be combined.

Referring to FIG. 1. The gimbal control system includes a gimbal 100 and a terminal 200, where the terminal 200 and the gimbal 100 are communicatively connected, and a user can operate the terminal 200 to control the gimbal 100 to rotate. More specifically, an App (e.g., an application software) may be installed on the terminal 200. When the App is turned on, the terminal 200 may display an operation interface, and the user may control the gimbal 100 to rotate through the operation interface of the terminal 200. The gimbal 100 of the present embodiment may be a two-axis gimbal 100 or a three-axis gimbal 100. The gimbal 100 may include an axis assembly 120, and a camera 400 may be connected to the axis assembly. As such, the rotation of the camera 400 may be controlled by controlling the rotation of the axis assembly 120. The terminal 200 may further include a smart phone, a tablet, a desktop computer, and a computer. In some embodiments, the terminal may also be a remote controller integrated with a touch screen and a control module, or may be glasses, gloves, helmets, microphones, or any combination thereof controlled by somatosensory or sound, which does not need to install an App to control the gimbal through the touch screen or buttons on the remote controller.

Figure 2:
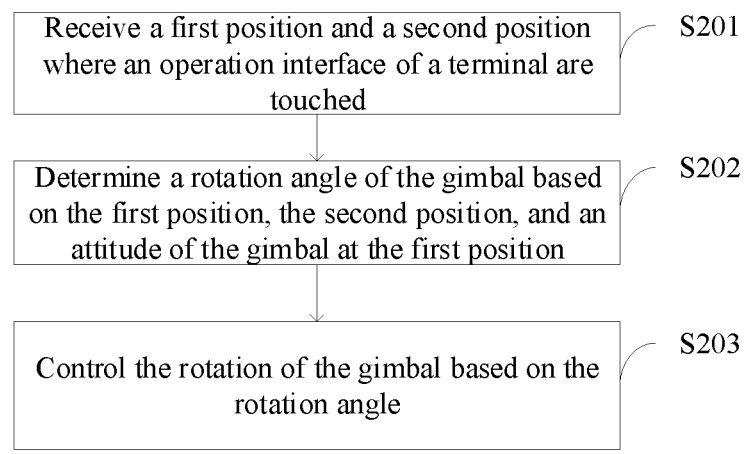
FIG. 2 is a flowchart of the gimbal control method on the gimbal side according to an embodiment of the present disclosure.
Figure 3:
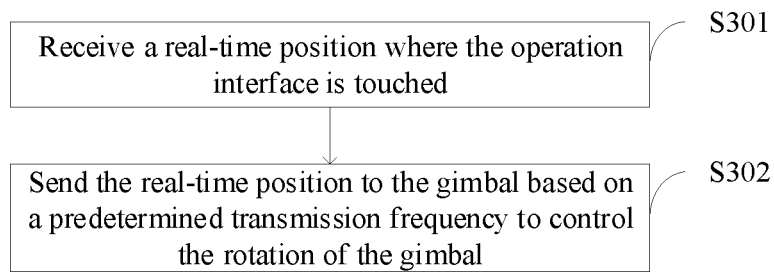
FIG. 3 is a flowchart of the gimbal control method on a terminal side according to an embodiment of the present disclosure.

Referring to FIG. 2 and FIG. 3, which are embodiments of the gimbal control method of the present disclosure. The process of the gimbal control method is as follow. First, the terminal 200 receives a real-time position touched on the operation interface, and sends the real-time position to the gimbal 100 based on a predetermined transmission frequency. The gimbal 100 receives a first position and a second position where the operation interface of the terminal 200 are touched. Subsequently, the rotation angle of the gimbal 100 can be determined based on the first position, the second position, and an attitude of the gimbal 100 at the first position, and control the rotation of the gimbal 100 based on the rotation angle. In the embodiments of the present disclosure, the gimbal 100 may determine the rotation angle of the gimbal 100 based on the first position and the second position touched on the operation interface of the terminal 200 and the attitude of the gimbal 100 at the first position. As such, the gimbal control method is incrementally realized, which may be more in line with the user's operating habits, provide a better user experience, and the control method may be more convenient and faster.

Referring to FIG. 2, which is a flowchart of the gimbal control method according to an embodiment of the present disclosure described from the gimbal 100 side. The gimbal control method is described in detail below.

S201, receiving a first position and a second position where an operation interface of a terminal 200 are touched.

Figure 4:
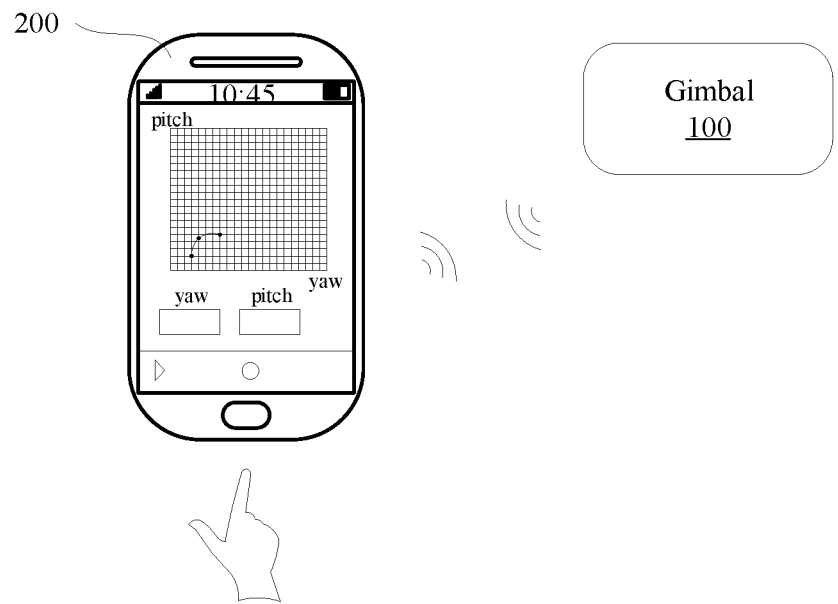
FIG. 4 is an application scenario of the gimbal control system according to an embodiment of the present disclosure.

In the present embodiment, the terminal 200 may receive the real-time position where the operation interface is touched and send the real-time position to the gimbal 100 based on a predetermined transmission frequency. The manner in which the operation interface is touched can be selected based on the actual needs. For example, the user may directly touch the operation interface with a finger, or the user can use other tools such as a touch pen to touch the operation interface. Referring to FIG. 4, in a specific application scenario, the terminal 200 may be a mobile phone, and the user may directly touch the touch operation interface of the mobile phone using a finger. The mobile phone may receive the real-time position where the operation interface is touched and send the real-time position to the gimbal 100 at a transmission frequency of 50 Hz.

Further, the operation interface may be in a touched state between the first position and the second position. More specifically, the user may touch the operation interface using a finger or other tools, and slide from the first position to the second position. That is, the first position and the second position may be generated by the users sliding continuously on the operation interface. It should be noted that between the first position and the second position mentioned above may refer to a time period during which the first position where the operation interface is touch and the second position where the operation interface is touched.

S202, determining a rotation angle of the gimbal 100 based on the first position, the second position, and an attitude of the gimbal at the first position.

In some embodiments, S202 may include determining an incremental angle of the gimbal 100 at the second position based on an amount of pixel change between the first position and the second position; and determining the rotation angle of the gimbal 100 based on the incremental angle of the gimbal 100 at the second position and the attitude of the gimbal at the first position. In the present embodiment, the real-time position where the operation interface is touched may be reflected in the form of pixel coordinates, and the amount of pixel change between the first position and the second position may be a difference between the pixel coordinates corresponding to the first position and the pixel coordinates corresponding to the second position. In some embodiments, for every 10 pixel changes, the corresponding incremental angle may be 1°. For example, sliding from the first position to the second position may have moved 100 pixels, and the corresponding incremental angle may be 10°. Based on the current attitude of the gimbal 100, the axis assembly 120 of the gimbal 100 may be controlled to rotate 10°.

In some embodiments, the pixel coordinates may include yaw-axis pixel coordinates and pitch-axis pixel coordinates. Further, determining the incremental angle of the gimbal 100 at the second position based on the amount of pixel change between the first position and the second position may include determining the incremental angle of the yaw-axis of the gimbal 100 at the second position based on the amount of pixel change of the first position and the second position in the horizontal direction (the horizontal direction as shown in FIG. 4) of the operation interface, and controlling the rotation of the yaw-axis based on the incremental angle of the yaw-axis by using the gimbal 100. Furthermore, determining the incremental angle of the gimbal 100 at the second position based on the amount of pixel change between the first position and the second position may include determining the incremental angle of pitch-axis of the gimbal 100 at the second position based on the amount of pixel change of the first position and the second position in the vertical direction (the vertical direction as shown in FIG. 4) of the operation interface, and controlling the rotation of the pitch-axis based on the incremental angle of the yaw-axis by using the gimbal 100. In the present embodiment, the user may move on the operation interface to control the attitude angle of the yaw-axis and the pitch-axis of the gimbal 100.

In the present embodiment, if the first position is the starting position of the user's current movement on the operation interface, the attitude of the gimbal 100 at the first position can be directly detected by an inertial measurement unit (IMU) on the gimbal 100. If the first position is not the starting position of the user's current movement on the operation interface, the attitude of the gimbal 100 at the first position can be directly detected by the IMU on the gimbal 100, or calculated based on the real-time position where the operation interface is touched received by the gimbal 100.

In addition, determining the rotation angle of the gimbal 100 based on the incremental angle at the second position and the attitude of the gimbal 100 at the first position may include determining a moving speed of the gimbal 100 based on the incremental angle of the gimbal 100 at the second position, the incremental angle of the gimbal 100 at the first position, and a time interval between receiving the first position and receiving the second position; and determining the rotation angle of the gimbal 100 based on the moving speed, In the present embodiment, the gimbal moving speed v=s/t, where s may be the difference between the incremental angle of the gimbal 100 at the second position and the incremental angle of the gimbal 100 at the first position, and t may be time interval between the gimbal 100 receiving the second position and the gimbal 100 receiving the first position.

Further, determining the rotation angle of the gimbal 100 based on the moving speed may include adjusting the moving speed based on a predetermined speed amplitude; and determining the rotation angle of the gimbal 100 based on the adjusted moving speed. In some embodiments, the speed amplitude may be determined by the speed limits (e.g., maximum speed) of the yaw-axis motor and the pitch-axis motor, or may be set by the user such that the moving speed of the gimbal 100 can meet the hardware and user needs.

The transmission frequency of the terminal 200 to send the touched position of the operation interface may be the same or different from the processing frequency of the gimbal 100 to process the received touched position of the operation interface. The embodiment described above for acquiring the rotation angle of the gimbal 100 by calculating the moving speed of the gimbal 100 is applicable to both cases where the transmission frequency and the processing frequency may be the same or different.

However, when the transmission frequency of the terminal 200 is less than the processing frequency of the gimbal 100, for example, the transmission frequency of the terminal 200 may be 50 Hz and the processing frequency of the gimbal 100 may be 200 Hz, there may be a delay when the terminal 200 sends the real-time position to the gimbal 100. As such, the gimbal 100 may have not received an updated position, but the operation interface may have been touched at a new position, at this time, the gimbal 100 still needs to rotate. More specifically, after receiving the first position where the operation interface of the terminal 200 is touched, the method may further include determining a new touched position of the operation interface has not been received in a predetermined amount of time; determining an expected rotation angle of the gimbal 100 based on the incremental angle of the gimbal 100 at the first position, the current moving speed of the gimbal 100 (e.g., the moving speed of the gimbal 100 at any time in the period from receiving the first position to the current time), and the time interval from the current time to receiving the first position; and determining the rotation angle of the gimbal 100 based on the expected rotation angle. In some embodiments, the predetermined amount of time may be determined by the transmission frequency at which the terminal 200 sends the touched position of the operation interface. For example, when the transmission frequency is 50 Hz, the predetermined amount of time may be 0.02 s. That is, within 0.02 s after receiving the first position, the gimbal 100 may determine that a new touched position of the operation interface has not been received. In the present embodiment, the expected rotation angle of the gimbal 100 may be the incremental angle of the gimbal 100 in the first position plus the current moving speed of the gimbal 100 multiplied by $(t-t_1)$, where t may be the current time and t1 may be the time when the gimbal 100 receives the first position. Of course, a person skilled in the art can also adjust the expected rotation angle of the gimbal 100 based on experience.

In the present embodiment, determining the rotation angle of the gimbal 100 based on the expected may include adjusting the expected rotation angle based on a predetermined angle amplitude; and determining the rotation angle of the gimbal 100 based on the adjusted expected rotation angle. In some embodiments, the angle amplitude may be determined by the rotation angle limits (e.g., maximum angle) of the yaw-axis motor and the pitch-axis motor, or may be set by the user such that the moving speed of the gimbal 100 can meet the hardware and user needs.

S203, controlling the rotation of the gimbal 100 based on the rotation angle.

After performing S201 to S203, the incremental rotation control of the gimbal 100 can be realized to provide an operation method that may be more in line with the user's operating habits.

After S203, the method may further include stopping the rotation of the gimbal 100 in response to determining a time interval between the current time and the last time the touched position of the operation interface of the terminal 200 is received exceeding a predetermined amount of time. In the present embodiment, the time interval between the current time and the last time the touched position of the operation interface of the terminal 200 is received exceeding the predetermined amount of time may indicate that the user has stopped the current movement on the operation interface, and the operation interface is in a released state. In some embodiments, the predetermined amount of time may be determined by the transmission frequency of which the terminal 200 sends the touched position of the operation interface. For example, the transmission frequency being 50 Hz and the time interval between the current time and the last time the touched position of the operation interface of the terminal 200 is received exceeds 0.02 s may indicate that the user has stopped the current movement on the operation interface. As such, the rotation of the gimbal 100 may be stopped.

Further, the method may include receiving an initial position where the operation interface of the terminal 200 is touched, and determining that the operation interface has not been touched before; and storing the attitude of the gimbal 100 at the initial position. In the present embodiment, the gimbal 100 receiving the initial position where the operation interface of the terminal 200 is touched and determining that the operation interface has not been touched before may indicate that the user has just touched the operation interface. In some embodiments, the attitude of the gimbal 100 at the initial position may be directed acquired through the IMU of the gimbal 100.

Furthermore, after storing the attitude of the gimbal 100 at the initial position, the method may further include receiving a third position where the operation interface is touched again; determining the rotation angle of the gimbal 100 based on the initial position, the third position, and the attitude of the gimbal 100 at the initial position; and controlling the rotation of the gimbal 100 based on the rotation angle. On the operation interface, the initial position and the third position may be successively sent from the terminal 200 to the gimbal 100, therefore, the gimbal 100 may not receive other positions between the initial positon and the third position. For the method of determining the rotation angle of the gimbal 100 based on the initial position, the third position, and the attitude of the gimbal 100 at the initial position, reference may be made to the method of determining the rotation angle of the gimbal 100 based on the first position, the second position, and the stored attitude of the gimbal 100 at the first position described in the above embodiment, which will not be repeated herein.

Figure 5:
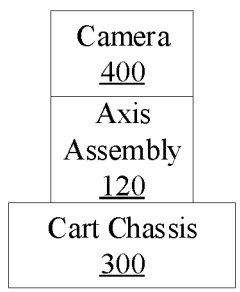
FIG. 5 is a structural block diagram of the gimbal control system according to another embodiment of the present disclosure.

Referring to FIG. 5, the gimbal 100 of the present embodiment may be mounted on a movable platform, such as a cart. More specifically, the yaw-axis of the gimbal 100 may be connected to the cart chassis 300. After determining the rotation angle of the gimbal 100 based on the first position, the second position, and the attitude of the gimbal 100 at the first position, the method may further include controlling the rotation of the cart chassis 300 for carrying the gimbal 100 based on the rotation angle of the gimbal 100 such that the orientation of the cart chassis 300 and the orientation of a certain position of the gimbal 100 are substantially the same. In some embodiments, controlling the rotation of the cart chassis 300 for carrying the gimbal 100 based on the rotation angle of the gimbal 100 and 5203 can be performed simultaneously or in order. More specifically, controlling the rotation of the cart chassis 300 for carrying the gimbal 100 based on the rotation angle of the gimbal 100 may include controlling the rotation of the cart chassis 300 based on the rotation angle of the yaw-axis of the gimbal 100 such that the yaw-axis direction of the cart chassis 300 and the gimbal 100 may coincide.

Referring to FIG. 3, which is a flowchart of the gimbal control method according to an embodiment of the present disclosure described from the terminal 200 side. The gimbal control method is described in detail below.

S301, receiving a real-time position where the operation interface is touched.

In the present embodiment, the real-time position may be the real-time pixel coordinates where the operation interface is touched. In some embodiments, the pixel coordinates may include yaw-axis pixel coordinates and pitch-axis pixel coordinates. Referring to FIG. 4, the coordinate axis of the operation interface in the horizontal direction may correspond to the pixel coordinates of the yaw-axis of the gimbal 100, and the coordinate axis of the operation interface in the vertical direction may correspond to the pixel coordinates of the pitch-axis of the gimbal 100.

S302, sending the real-time position to the gimbal 100 based on a predetermined transmission frequency to control the rotation of the gimbal 100.

In the present embodiment, the transmission frequency may be set as needed. For example, the transmission frequency may be 50 Hz.

In some embodiments, the frequency at which the terminal 200 sends the real-time position may be different from the frequency at which the gimbal 100 processes the received real-time position. For example, the frequency at which the terminal 200 sends the real-time position may be less than the frequency at which the gimbal 100 processes the received real-time position.

In some embodiments, the frequency at which the terminal 200 sends the real-time position may be the same as the frequency at which the gimbal 100 processes the received real-time position.

Corresponding to the gimbal control method described above, the present disclosure also provides an embodiment of a gimbal control device.

The gimbal control device of the present disclosure may be applied on the gimbal 100 and the terminal 200, respectively. The device embodiments can be implemented by software, hardware, or a combination of both. In the case of software implementation, a logical device is formed by reading the corresponding computer program instructions in a non-volatile memory into a memory through a processor of the device where it is located. In the case of hardware implementation, in addition to the processor, network interface, memory, and non-volatile memory, the device where the device is located may generally include other hardware, such as a forwarding chip responsible for processing signals, etc. In terms of hardware structure, the device may also be a distributed device that may include multiple interface cards to extend the signal processing at the hardware level.

Figure 6:
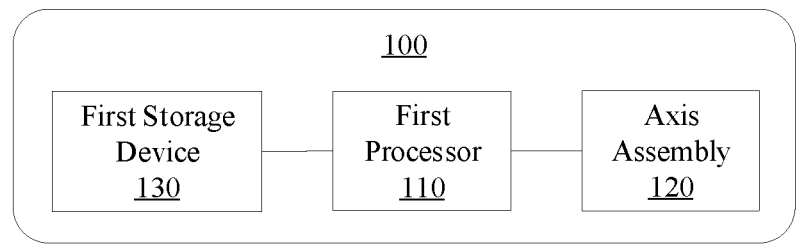
FIG. 6 is a block diagram of a gimbal control device on the gimbal side according to an embodiment of the present disclosure.

Referring to FIG. 6, which is a block diagram of a gimbal control device according to an embodiment of the present disclosure. The device may be applied on the gimbal 100, and the device may include a first processor 110 and an axis assembly 120. In particular, the first processor 110 may be communicatively connected to the axis assembly 120.

In some embodiments, the first processor 110 may be a central processing unit (CPU). The first processor 110 may include a hardware chip. The hardware chip may be an application-specific integrated circuit (ASIC), a programmable logic device (PLD), a field-programmable gate array (FPGA), a generic array logic (GAL), or any combination thereof.

In some embodiments, the first processor 110 may include one or more first processors 110, which operate individually or collectively. The first processor 110 may be configured to receive a first position and a second position where the operation interface of the terminal 200 are touched; determine a rotation angle of the gimbal 100 based on the first position, the second position, and an attitude of the gimbal 100 at the first position; and control the rotation of the axis assembly 120 based on the rotation angle.

Further, the gimbal control device may include a first storage device 130. The first storage device 130 may include a volatile memory, such as a random-access memory (RAM). The first storage device 130 may also include a non-volatile memory, a flash memory, a hard disk drive (HDD), or a solid-state drive (SSD). In addition, the first storage device 130 may also include a combination of the types of memories mentioned above. In some embodiments, the first storage device 130 can be used to store program instructions. The first processor 110 may call the program instructions to implement the gimbal control method applied to the gimbal 100 as described in the above embodiment.

The specific principles and implementations of the gimbal control device provided by the embodiment of the present disclosure are similar to the embodiment shown in FIG. 2 above, and will not be repeated herein.

Figure 7:
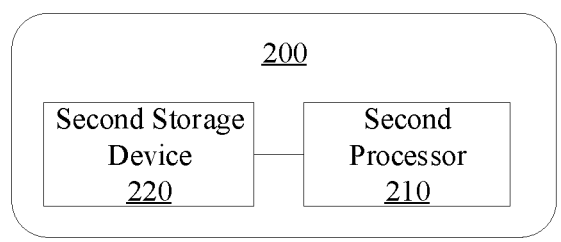
FIG. 7 is a flowchart of the gimbal control device on the terminal side according to an embodiment of the present disclosure.

Referring to FIG. 7, which is a block diagram of a gimbal control device according to an embodiment of the present disclosure. The device may be applied on the terminal 200, and the device may include a second processor 210, where the second processor 210 may be communicatively connected to the gimbal 100.

In some embodiments, the second processor 210 may be a central processing unit (CPU). The first processor 110 may include a hardware chip. The hardware chip may be an application-specific integrated circuit (ASIC), a programmable logic device (PLD), a field-programmable gate array (FPGA), a generic array logic (GAL), or any combination thereof.

In some embodiments, the second processor 210 may include one or more second processors 210, which operate individually or collectively.

The second processor 210 may be configured to receive a real-time position where the operation interface is touched; and send the real-time position to the gimbal 100 based on a predetermined transmission frequency to control the rotation of the gimbal 100.

Further, the gimbal control device may include a second storage device 220. The second storage device 220 may include a volatile memory, such as a random-access memory (RAM). The second storage device 220 may also include a non-volatile memory, a flash memory, a hard disk drive (HDD), or a solid-state drive (SSD). In addition, the second storage device 220 may also include a combination of the types of memories mentioned above. In some embodiments, the second storage device 220 can be used to store program instructions. The second processor 210 may call the program instructions to implement the gimbal control method applied to the terminal 200 as described in the above embodiment.

The specific principles and implementations of the gimbal control device provided by the embodiment of the present disclosure are similar to the embodiment shown in FIG. 3 above, and will not be repeated herein.

Figure 8:
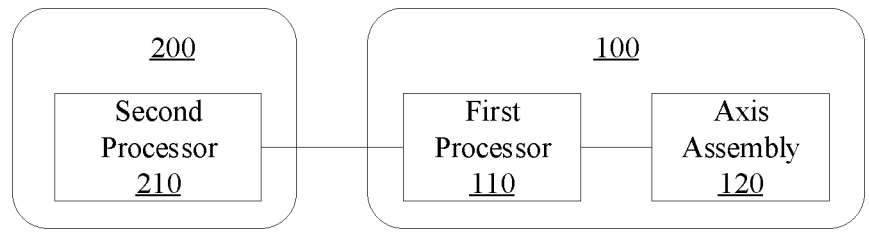
FIG. 8 is a structural block diagram of the gimbal control system according to yet another embodiment of the present disclosure.

Referring to FIG. 8, in the embodiments of the present disclosure, the first processor 110 and the second processor 210 may be communicatively connected, such as a wireless-based communication connection to realize data interaction.

An embodiment of the present disclosure further provides a computer-readable storage medium on which a computer program is stored. The program can be executed by the first processor to perform the gimbal control method shown in FIG. 2. The specific principles and implementations are similar to the embodiment shown in FIG. 2 above, and will not be repeated herein.

In addition, the program can be executed by the second processor to perform the gimbal control method shown in FIG. 3. The specific principles and implementations are similar to the embodiment shown in FIG. 3 above, and will not be repeated herein.

For the device embodiments, the operation principles are corresponding to the method embodiments. For description of related parts of the device embodiments, reference may be made to the description of the related parts of the method embodiments. The description of the device embodiments is intended to be illustrative. The units described as separate parts may or may not be physically separated. The parts displayed as units may or may not be physical units, that is, may not be located in one place, and may be distributed in a plurality of network units. Some or all modules may be selected according to actual needs to achieve the objectives of the technical solution of the present disclosure. Those of ordinary skill in the art may comprehend and implement the technical solution without any creative effort.

The description of the "examples" or "some embodiments" is intended to include the particular features, structures, materials, or characteristics described included in at least one example or one embodiment. In the specification, the representation of the above terms does not necessarily mean the same example or same embodiment. Further, the described features, structures, materials, or characteristics may be combined in a suitable manner in one or more examples or embodiments.

Any process or method described in the flowcharts or in other manners may be understood as a module, a fragment, or a portion of code that includes one or more executable instructions for implementing a particular logic function or a particular process. The scope of the embodiments of the present disclosure includes additional implementations. The embodiments may not be implemented according to the order of the illustrations or discussions. Some or all functions may be implemented concurrently or in a reverse order, which should be understood by those of ordinary skill in the art.

The logic and/or step described in the flowcharts or in other manners may be considered as, for example, an ordered list of executable instructions for implementing the logic functions and may be embodied in any computer-readable storage medium for use by an instruction execution system, an apparatus, a device (e.g., a computer-based system, a system including a processor, or other instruction execution system where an apparatus or a device retrieves and executes the instructions), or combinations thereof. In the specification, "computer-readable storage medium" may be any medium that contains, stores, communicates, propagates, or transfers programs for use in the instruction execution system, the apparatus, the device, or combinations thereof. For example, the computer-readable storage medium may include, but is not limited to, an electrical connection including one or more wires (an electronic device), a portable computer disk cartridge (a magnetic device), a random-access memory (RAM), a read-only memory (ROM), an erasable programmable read-only memory (EPROM or flash memory), an optical fiber device, and a portable optical disk read-only memory (CD-ROM). In addition, the computer-readable storage medium may be papers printed with the programs or other suitable medium because the papers or other medium may be optically scanned, edited, interpreted, or processed in other suitable manners to electronically obtain the programs, which can then be stored in the computer-readable storage medium.

Some or all portions of the embodiments may be implemented in hardware, software, firmware, or combinations thereof. In some embodiments, the processes or methods may be implemented in software or firmware stored in the memory and executed by a suitable instruction execution system. In some other embodiments, the processes or methods may be implemented in hardware including any one of the following well-known technical solutions or combinations thereof, such as discrete logic circuits including logic gate circuits for implementing logic functions on digital data signals, application specific integrated circuits including suitable combination logic gate circuits, programmable gate arrays (PGA), and field programmable gate arrays (FPGA).

Those of ordinary skill in the art can understand that all or some of the processes implementing the foregoing embodiments of the present disclosure may be implemented by programs instructing the related hardware the programs may be stored in the computer-readable storage medium. When being executed, the programs performs the processes implementing all or some method embodiments.

In addition, the functional units in the embodiments of the present disclosure may be integrated into one processing module, may be distributed to a plurality of physically separate units, or may have two or more units integrated into one module. The integrated modules may be implemented in hardware or in software function modules. When being implemented in software function modules and used or sold as an independent product, the integrated modules may be stored in the computer-readable storage medium.

The storage medium may be a read-only memory (ROM), a magnetic disk, or an optical disk. The foregoing descriptions are merely some implementation manners of the present disclosure, but the scope of the present disclosure is not limited thereto. Without departing from the spirit and principles of the present disclosure, any modifications, equivalent substitutions, and improvements, etc., shall fall within the scope of the present disclosure. The scope of the invention should be determined by the appended claims.

What is claimed is:

1. A gimbal control method, comprising:
 receiving a first position and a second position wherein the first position and the second position are touched positions of an operation interface of a terminal;
 determining a rotation angle of a gimbal based on the first position, the second position, and an attitude of the gimbal at the first position, including:

determining an incremental angle of the gimbal at the second position based on an amount of pixel change between the first position and the second position, including:
    determining a yaw-axis incremental angle of the gimbal at the second position based on the amount of pixel change of the first position and the second position in a horizontal direction of the operation interface; or
    determining a pitch-axis incremental angle of the gimbal at the second position based on the amount of pixel change of the first position and the second position in a vertical direction of the operation interface; and
    determining the rotation angle of the gimbal based on the incremental angle of the gimbal at the second position and the attitude of the gimbal at the first position; and
controlling rotation of the gimbal based on the rotation angle.

2. The method of claim 1, wherein:
the operation interface is in a touched state between the first position and the second position.

3. The method of claim 1, wherein determining the rotation angle of the gimbal based on the incremental angle at the second position and the attitude of the gimbal at the first position further includes:
    determining a moving speed of the gimbal based on the incremental angle of the gimbal at the second position, an incremental angle of the gimbal at the first position, and a time interval between receiving the first position and receiving the second position; and
    determining the rotation angle of the gimbal based on the moving speed.

4. The method of claim 3, wherein determining the rotation angle of the gimbal based on the moving speed includes:
    adjusting the moving speed based on a speed amplitude; and
    determining the rotation angle of the gimbal based on an adjusted moving speed.

5. The method of claim 1, wherein:
a transmission frequency at which the terminal sends a touched position of the operation interface is the same as a processing frequency at which the gimbal processes the received touched position of the operation interface.

6. The method of claim 1, wherein:
the transmission frequency at which the terminal sends a touched position of the operation interface is different from the processing frequency at which the gimbal processes the received touched position of the operation interface.

7. The method of claim 6, wherein:
the transmission frequency of the terminal is lower than the processing frequency of the gimbal.

8. The method of claim 7, wherein after receiving the first position where the operation interface of the terminal is touched further includes:
    determining a new position where the operation interface is touched has not been received in a predetermined time;
    determining an expected rotation angle of the gimbal based on the incremental angle of the gimbal at the first position, a current moving speed of the gimbal, and a time interval between a current time and a time of receiving the first position; and
    determining the rotation angle of the gimbal based on the expected rotation angle.

9. The method of claim 8, wherein determining the rotation angle of the gimbal based on the expected rotation angle includes:
    adjusting the expected rotation angle based on an angle amplitude; and
    determining the rotation angle of the gimbal based on an adjusted expected rotation angle.

10. The method of claim 1, wherein controlling the rotation of the gimbal based on the rotation angle further includes:
    stopping the rotation of the gimbal in response to determining a time interval between the current time and a last time the operation interface of the terminal is touched exceeding a predetermined amount of time.

11. The method of claim 10, wherein:
the predetermined amount of time is determined by the transmission frequency of the terminal sending the touched position of the operation interface.

12. The method of claim 1, further comprising:
    receiving an initial position where the operation interface of the terminal is touched and determining the operation interface has not been touched before; and
    recording the attitude of the gimbal at the initial position.

13. The method of claim 12, wherein after storing the attitude of the gimbal at the initial position further includes:
    receiving a third position where the operation interface is touched;
    determining the rotation angle of the gimbal based on the initial position, the third position, and the stored attitude of the gimbal at the initial position; and
    controlling the rotation of the gimbal based on the rotation angle.

14. The method of claim 1, wherein after determining the rotation angle of the gimbal based on the first position, the second position, and the attitude of the gimbal at the first position further includes:
    controlling rotation of a cart chassis used to mount the gimbal based on the rotation angle.

15. The method of claim 14, controlling the rotation of the cart chassis used to mount the gimbal based on the rotation angle further includes:
    controlling the rotation of the cart chassis based on a yaw-axis rotation angle of the gimbal to align the yaw-axis of the cart chassis and the gimbal in the same direction.

16. A gimbal control device, comprising:
    a first processor;
    an axis assembly, the first processor being communicatively connected to the axis assembly and a terminal;
    the first processor including one or more first processors operating individually or collectively;
    the first processor being configured to:
        receive a first position and a second position wherein the first position and the second position are touched positions of an operation interface of a terminal;
        determine a rotation angle of the gimbal based on the first position, the second position, and an attitude of the gimbal at the first position, including:
            determining an incremental angle of the gimbal at the second position based on an amount of pixel change between the first position and the second position, including:
                determining a yaw-axis incremental angle of the gimbal at the second position based on the amount of pixel change of the first position and the second position in a horizontal direction of the operation interface; or determining a pitch-axis incremental angle of the gimbal at the second position based on the amount of pixel change of the first position and the second position in a vertical direction of the operation interface; and determining the rotation angle of the gimbal based on the incremental angle of the gimbal at the second position and the attitude of the gimbal at the first position; and control rotation of the gimbal based on the rotation angle.

* * * * *